(12) United States Patent
Parry

(10) Patent No.: US 8,667,104 B2
(45) Date of Patent: Mar. 4, 2014

(54) FIRMWARE/SOFTWARE UPGRADE ALERT METHOD AND APPARATUS

(75) Inventor: Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2727 days.

(21) Appl. No.: 10/144,922

(22) Filed: May 14, 2002

(65) Prior Publication Data

US 2003/0217124 A1 Nov. 20, 2003

(51) Int. Cl.
*G06F 15/173* (2006.01)
(52) U.S. Cl.
USPC .......................................................... 709/223
(58) Field of Classification Search
USPC ........... 714/44, 33, 46, 57; 713/191; 709/223; 717/168–178
See application file for complete search history.

(56) References Cited

U.S. PATENT DOCUMENTS

| | | | |
|---|---|---|---|
| 5,870,610 A | 2/1999 | Beyda | |
| 6,668,374 B1 * | 12/2003 | Sten et al. | 717/173 |
| 6,782,495 B2 * | 8/2004 | Bernklau-Halvor | 714/44 |
| 2001/0053947 A1 * | 12/2001 | Lenz et al. | 700/117 |
| 2002/0112175 A1 * | 8/2002 | Makofka et al. | 713/200 |
| 2003/0066066 A1 * | 4/2003 | Nguyen et al. | 717/178 |
| 2004/0003266 A1 * | 1/2004 | Moshir et al. | 713/191 |
| 2005/0257214 A1 * | 11/2005 | Moshir et al. | 717/171 |

FOREIGN PATENT DOCUMENTS

WO    WO 0017749    *   3/2000    .............. G06F 9/445

* cited by examiner

*Primary Examiner* — Karen Tang

(57) ABSTRACT

A method and system for notifying a network administrator of any attempted or actual remote firmware upgrades, or software updates, occurring on a network device, particularly a printing device, wherein a network administrator may be informed of the remote firmware update by e-mail.

20 Claims, 1 Drawing Sheet

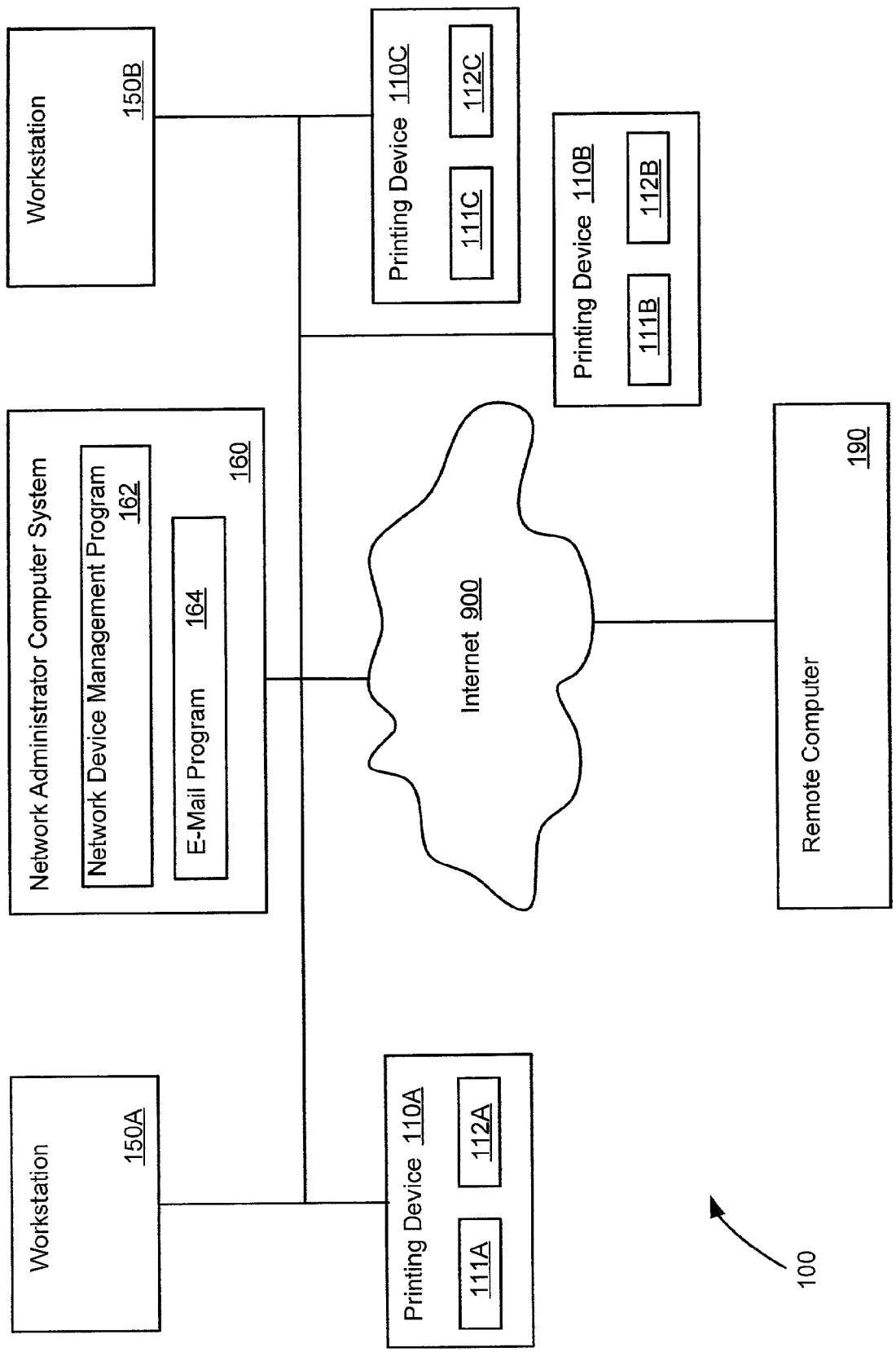

FIRMWARE/SOFTWARE UPGRADE ALERT METHOD AND APPARATUS

FIELD OF THE INVENTION

The present invention relates to the monitoring of devices for software or firmware upgrades. More particularly, the present invention relates to a method and system for notifying a system manager of any attempted changes to the software or firmware of a device on a network computer system.

BACKGROUND OF THE INVENTION

The use and management of network devices with network computer systems or in enterprise environments is well known. As fast as new devices are becoming available, new methods and systems for managing the devices added to network computing systems are developed.

Printing devices are one of the most commonly monitored devices in network computer systems. Printing devices may include devices such as printers, copiers, multifunction printers/copiers/scanners, and the like. The monitoring of printing devices is usually accomplished using a program or system for monitoring the usage of the devices. One well-known printer management system is the Web JetAdmin program offered by Hewlett-Packard®. Web JetAdmin provides a platform for a network administrator to manage network components from a central location or through a single computer capable of communicating with the network being controlled. Once installed on a network computer system, Web JetAdmin may be accessed from anywhere in the world through a web-browser having communication capabilities with the network computer system. The Web JetAdmin program therefore allows a network administrator to control and configure the printing devices of a network computer system from any location.

The Web JetAdmin program offers many features that may be used to set-up printing devices or monitor the status of printing devices connected to a network computer system. New printing devices may be installed on a network computer system and configured with the desired user settings using the Web JetAdmin program. The Web JetAdmin program also serves as a monitor for active printing devices and is capable of warning a network administrator of problems associated with the network printing devices. For instance, error messages associated with one or more printers in a network system may be broadcast to a network administrator through the Web JetAdmin program or interface. Common error messages include messages that may also be broadcast on a printing device, such as low-toner messages, empty paper tray messages, or paper jam messages. Web JetAdmin may also be used to search and organize the printing devices on a network into groups based upon criteria set by the network administrator. This provides the capability to monitor various printing devices according to usage variables, or configure user preferences according to printing device location or size.

The use of device management programs, such as Web JetAdmin, provide efficient solutions for monitoring and operating multiple devices in enterprise environments. Furthermore, device management programs allow for the optimization of services across a network computer system because the operations of all of the network devices may be monitored and altered in real-time, by one individual, from a central location.

Besides the standard user configurations and options associated with network devices that may be monitored and altered by device management programs, many network devices also include integrated programming that defines, or controls, the available functions and options of a network device. For instance, many network printing devices include firmware programmed into a read-only memory (ROM) of the printing device. Firmware is essentially a computer program in a printing device memory for providing functionality to the printing device. Various functions may be programmed into the firmware of a printing device to provide additional options, tools and functionality to the printing device.

In addition to firmware, network devices may also store software in a memory, such as flash memory, for enhancing the capabilities and performance of the network device. A network manager or a user operating the device may load different software programs into the memory of a network device as needed.

Firmware and software stored within a memory, or on a chip, of a device may be updated on a periodic basis. Installation of updated firmware or software may be accomplished using a special user interface or program. Typically, a network administrator handles the updating of firmware and software using interface programs. In some instances, however, devices may support Remote Firmware Upgrading. Remote firmware upgrading allows any individual having rights to send information to a network device to send a firmware or software upgrade to the network device. Once sent, the firmware or software is automatically installed on the device if the sender is authorized to send data to the device.

The ability for any authorized user to perform a remote firmware upgrade on a network device, such as a printing device, may pose problems for a network administrator. For instance, the network administrator may not be able to easily keep track of the remote firmware upgrades, and thus, may not be able to maintain the desired firmware on network devices. Therefore, it may be desirable to notify a network administrator of any actual, or attempted, remote firmware upgrade.

SUMMARY OF THE INVENTION

The present invention relates to the monitoring of devices for software or firmware upgrades. More particularly, the present invention relates to a method and system for notifying a system manager of any attempted changes to the software or firmware of a device on a network computer system.

In one embodiment of the present invention, a network device hosting an embedded web server may notify a network administrator of an attempted remote firmware upgrade to that particular network device. Upon receiving a remote firmware upgrade request, the network device may compose an e-mail containing information identifying the network device upon which the remote firmware upgrade is attempted, the time of the attempted remote firmware upgrade, an identification of a user requesting the upgrade, and the version of firmware sent with the remote firmware upgrade. The e-mail may be sent to a network administrator, thereby notifying the network administrator of the attempted remote firmware upgrade. The term "network administrator" as used in the description and claims of the present invention includes network administrators, system administrators or other individuals to which an alert of an attempted remote firmware upgrade may be sent.

In another embodiment of the present invention, a printing device on a network system may be equipped with an embedded web server for sending e-mails. A program, or programming scripts, resident in a memory of the printing device or embedded web server may be used to automatically send an e-mail to a computer associated with the network administrator any time a firmware upgrade is attempted on the printing device. Upon receiving a firmware upgrade request, be it authorized or unauthorized, the embedded web server composes an e-mail and sends the e-mail to the computer associated with the network administrator. The e-mail informs the network administrator of the proposed firmware upgrade, or of a remote firmware upgrade that took place. Additional information such as the time and date of the remote firmware upgrade, the initiator of the remote firmware upgrade, or the origin of the remote firmware upgrade may also be included in the e-mail. Thus, the network administrator may be made aware of any changes to the printing device firmware and made aware of the firmware version presently residing in a memory of the printing device.

In yet another embodiment of the present invention, an e-mail may be sent by a network device, such as a printing device, to an e-mail address associated with a network administrator to inform the network administrator of any attempted, or actual, changes to software installed on a network device. As with the previous embodiments of the present invention, the e-mail may include information allowing a network administrator to determine when a software change was made or attempted, and who initiated the change. The notification may provide a network administrator greater control over the network devices.

DESCRIPTION OF THE DRAWINGS

While the specification concludes with claims particularly pointing out and distinctly claiming that which is regarded as the present invention, the present invention can be more readily ascertained from the following description of the invention when read in conjunction with the accompanying drawings in which:

FIG. 1 illustrates a block diagram of a network system that may be used to carry out the various embodiments of the present invention.

DETAILED DESCRIPTION OF THE INVENTION

The present invention relates to the monitoring of devices for software or firmware upgrades. More particularly, the present invention relates to a method and system for notifying a system manager of any attempted changes to the software or firmware of a device on a network computer system.

A network computer system 100 that may be used to carry out the various embodiments of the present invention is illustrated in FIG. 1. Multiple network devices, including printing devices 110, workstations 150 and a network administrator computer system 160, may communicate over an intranet or network. The intranet, and hence the network devices, may also be capable of communicating with remote devices through an Internet 900 communication link. Remote computers 190 may also be capable of communicating through the Internet 900. It is understood that additional network devices may also be included with the network system 100.

Printing devices 110 may include devices such as printers, copiers, multifunction printing devices, and the like. Typically, printing devices 110 include one or memories 111 for storing information. The memory 111 may include programmable read-only memory (ROM) or flash memory. Typically, any firmware or software used by a printing device 110 may be programmed into the memory 111, such as programmable ROM, of the printing device 110. The printing device 110 may also include remote firmware upgrade capabilities. If a printing device 110 includes remote firmware upgrade capabilities, a print job or other information sent to the printing device 110 may automatically alter, or update, the firmware or software resident in the memory 111 of the printing device 110.

A printing device 110 may also include an embedded web server 112 for receiving and sending e-mail or other information. Many printing devices 110 include an integrated or an aftermarket embedded web server 112 for enhancing the printing device 110 capabilities. The use of embedded web servers 112 with printing devices 110 is known.

Workstations 150A and 150B may include computers or other computing devices used by individuals across the network. Typically, a workstation 150 may include a computer system having one or more central processing units, memories, input devices, output devices, and storage devices, as known. In a network system 100, a workstation 150 may be authorized to send information to one or more network devices, including printing devices 110.

A network administrator computer system 160 may also be a computer system including one or more central processing units, memories, input devices, output devices, and storage devices. In most instances, the network administrator computer system 160 may also include one or more network device management programs 162 operating on the network administrator computer system 160. A network device management program 162 may be used to monitor, control, and analyze the various network devices and components that make up the network system 100. For instance, Hewlett-Packard's® Web JetAdmin program may operate on the network administrator computer system 160 for monitoring and controlling the printing devices 110 associated with the network system 100. In addition, the network administrator computer system 160 may include an e-mail program 164 for sending and receiving e-mail over the network or through the Internet 900.

Remote computers 190 may be any type of computer, computing device, or network computing system. A remote computer 190 may be authorized to access the network system 100 through the Internet 900 or other communications link and send information over the communication structure of the network system 100. In some instances, a remote computer 190 may be authorized to send information to a printing device 110. For instance, a remote computer 190 may access the network system 100 and send a print job to a printing device 110.

The advent of remote firmware upgrade capabilities allows any user having authorization to send information to a printing device 110 to send a remote firmware upgrade to the printing device 110 via a print job. Such information may alter the firmware or software resident in the memory 111 of the printing device 110. For instance, a user operating workstation 150A may attempt a remote firmware upgrade of a printing device 110A. The user may send a print job to printing device 110A for the sole purpose of altering the firmware of printing device 110A stored in memory 111A. Once sent to, and received by the printing device 110A, the remote firmware upgrade print job altars the firmware stored in the memory 111A of the printing device 110A. A network administrator tasked with the job of monitoring a network system 100 may not be aware of the change to the firmware of printing device 110A caused by the remote firmware upgrade print job sent from workstation 150A. To detect the change, the network administrator may be notified by the user of workstation 150A of the change or may stumble across the change when checking the firmware residing on printing device 110A. The ability of almost any network system 100 user to change the firmware residing on a printing device 110 using a remote firmware upgrade poses numerous problems, especially in enterprise environments where multiple users have access to multiple printing devices 110. The various embodiments of the present invention help to remedy the problems associated with notifying a network administrator of firmware changes instituted through remote firmware upgrades.

In one embodiment of the present invention, a network administrator is notified, by e-mail, of any attempted alterations of the firmware or software residing in the memories 111 of printing devices 110. In a case such as that described above, the printing device 110A receives the firmware altering print job from workstation 150A. Upon receipt of the print job, printing device 110A may determine that the print job is a remote firmware upgrade and begins the process of upgrading the firmware stored in memory 111A. Upon receiving the remote firmware upgrade print job, or upon initiating the firmware upgrade, printing device 110A may compose and send an e-mail to the network administrator computer system 160 notifying the network administrator of the firmware upgrade. The e-mail may be sent from printing device 110A to an e-mail address associated with the network administrator computer system 160 or e-mail program 164. A printing device 110 may send the e-mail using the embedded web server 112 of the printing device 110. Once the e-mail is sent to, and received by, the network administrator computer system 160, the network administrator is effectively notified of the remote firmware upgrade that occurred on printing device 110A. An e-mail address associated with the network administrator computer system 160 may be stored in a memory 111 of the printing device 110 or the embedded web server 112.

An e-mail sent by the embedded web server 112 of a printing device 110 for the purpose of notifying a network administrator of a firmware upgrade may contain a variety of information. The e-mail may include the information associated with a remote firmware upgrade print job sent to the printing device 110. For instance, the notification e-mail may include information about the time the remote firmware upgrade print job was sent, the date it was sent, the computer used to send the print job, a user identification associated with the user of the computer, the version of firmware included with the remote firmware upgrade print job, or other similar information that may help a network administrator determine who sent the remote firmware upgrade print job. In most cases, it may be desirable for the network administrator to know who was initiating the upgrade, thus a workstation identification code and any information about the individual using the workstation at the time the remote firmware upgrade was sent may be included in the e-mail. As desired, the network administrator may change the programming of the embedded web server 112 to include only that information in an email that the network administrator wishes to obtain.

In another embodiment of the present invention the embedded web server 112 of a printing device 110 may send an e-mail to a network administrator computer system 160 even if a remote firmware upgrade is unsuccessful. For instance, a remote computer 190 may be authorized to communicate with network system 100 and operate certain devices connected to network system 100. Remote computer 190 may have authorization rights to send print job and other data to printing device 110B but not to printing device 110C. If a user of remote computer 190 sends a remote firmware upgrade print job to printing device 110C the printing device 110C will not accept the print job because remote computer 190 does not have authorization rights to send a print job that printing device 110C. Upon receiving the unauthorized request, the embedded web server 112 of printing device 110C may compose and send an e-mail to an e-mail address associated with the network administrator computer system 160 to notify the network administrator that an unauthorized request to remotely update the firmware of printing device 110C was made. As with previous embodiments of the present invention, the e-mail may contain enough information to identify the remote computer, the user of the remote computer, and the firmware version or information that was sent to the printing device 110C and the time and date the remote firmware upgrade was sent.

On the other hand, if the remote firmware upgrade request was sent by remote computer 190 to printing device 110B, the remote firmware upgrade may occur because remote computer 190 is authorized to send print jobs and other data to printing device 110B. Upon receiving the authorized remote firmware upgrade, the embedded web server 112 of printing device 110B may notify the network administrator of an authorized remote firmware upgrade by sending an email. An e-mail sent to an e-mail address associated with the network administrator computer system 160 may contain any information necessary for the network administrator to ascertain the date, time, origin, and sender of the remote firmware upgrade.

In another embodiment of the present invention a network administrator may be notified by e-mail of any attempt to load software into the memory 111 of a printing device 110. As with the other embodiments of the present invention, if a printing device receives a request to change software loaded into the memory 111 of the printing device 110, the embedded web server 112 of the printing device 110 may send an e-mail to an e-mail address associated with the network administrator computer system 160, or e-mail program 164, to notify the network administrator of attempt to load software into the printing device 110 memory 111. Information that may be included in a software update notification e-mail may include information about the time and date the update took place, the initiator of the update, and any other information that may assist a network administrator in determining who initiated the software update.

Although the various embodiments of the present invention have been described with reference to printing devices 110 on a network system 100, it is understood that the present invention may also be incorporated and used with other network devices.

Having thus described certain preferred embodiments of the present invention, it is to be understood that the invention defined by the appended claims is not to be limited by particular details set forth in the above description, as many apparent variations thereof are possible without departing from the spirit or scope thereof as

What is claimed is:

1. A method for alerting a network administrator regarding a printing device, said method comprising:
  receiving at said printing device a remote firmware upgrade request for a firmware upgrade for said printing device sent independent of said network administrator; and
  composing and sending, by an embedded web server of said printing device, an e-mail from said printing device to an e-mail address associated with said network administrator for informing the network administrator of said request.

2. The method of claim 1, wherein said receiving a remote firmware upgrade request at said printing device is uninitiated by said printing device.

3. The method of claim 1, wherein said receiving a remote firmware upgrade request at said printing device comprises receiving a print job requesting a firmware upgrade.

4. The method of claim 3, wherein said print job requesting a firmware upgrade includes a firmware program for installation on said printing device.

5. The method of claim 1, wherein said composing and sending said e-mail comprises:
retrieving said e-mail address associated with said network administrator from a memory of said printing device.

6. The method of claim 1, wherein said composing and sending said e-mail comprises:
obtaining a time that said remote firmware upgrade request was made;
obtaining a date that said remote firmware upgrade request was made;
obtaining an identification code for identifying where said remote firmware upgrade request was initiated; and
including said time, said date, and said identification code in said e-mail.

7. The method of claim 1, wherein installation of said firmware upgrade is unsuccessful.

8. The method of claim 1, wherein installation of said firmware upgrade is successful.

9. The method of claim 1, wherein said firmware upgrade is unauthorized.

10. The method of claim 1, wherein said firmware upgrade is authorized.

11. A method for monitoring a printing device, said method comprising:
receiving at said printing device from an initiator other than a network administrator a request to upgrade firmware of a memory of said printing device;
collecting information from said request, wherein said information is selected from a time of the request, a date of the request, a user identification associated with the request, and an origin of the request;
composing, by an embedded web server of said printing device, an e-mail message with said collected information about said request; and
sending, by said embedded web server of said printing device, said e-mail message from said printing device to an e-mail address for alerting said network administrator of said request.

12. The method of claim 11, wherein said composing an e-mail message and sending said e-mail message from said printing device to an e-mail address include retrieving said e-mail address from said memory of said printing device.

13. The method of claim 11, wherein said received request is an unsuccessful request.

14. The method of claim 11, wherein said received request is a successful request.

15. The method of claim 11, wherein said received request is an unauthorized request.

16. The method of claim 11, wherein said received request is an authorized request.

17. A system for sending an e-mail notification, said system comprising:
a printing device having firmware stored in a memory thereof; and
an embedded web-server incorporated with said printing device,
said embedded web-server sending an e-mail from said printing device to a network administrator of said printing device upon receipt by said printing device of a remote firmware upgrade request for a firmware upgrade of said printing device initiated other than by said network administrator.

18. The system of claim 17, wherein said printing device is selected from the group consisting of a printer, a copier, a scanner, and a multifunction device.

19. The system of claim 17, wherein said email notifies said network administrator of an attempted remote firmware upgrade of said printing device.

20. The system of claim 17, wherein said email notifies said network administrator of an actual remote firmware upgrade of said printing device.

* * * * *

UNITED STATES PATENT AND TRADEMARK OFFICE
CERTIFICATE OF CORRECTION

| | |
|---|---|
| PATENT NO. | : 8,667,104 B2 |
| APPLICATION NO. | : 10/144922 |
| DATED | : March 4, 2014 |
| INVENTOR(S) | : Travis J. Parry |

It is certified that error appears in the above-identified patent and that said Letters Patent is hereby corrected as shown below:

In the Specification

In column 6, line 49, after "thereof as" insert -- hereinafter claimed. --.

Signed and Sealed this
Twenty-fourth Day of June, 2014

Michelle K. Lee
*Deputy Director of the United States Patent and Trademark Office*